US006301572B1

(12) United States Patent
Harrison

(10) Patent No.: US 6,301,572 B1
(45) Date of Patent: Oct. 9, 2001

(54) NEURAL NETWORK BASED ANALYSIS SYSTEM FOR VIBRATION ANALYSIS AND CONDITION MONITORING

(75) Inventor: Gregory A. Harrison, Oviedo, FL (US)

(73) Assignee: Lockheed Martin Corporation, Orlando, FL (US)

( * ) Notice: Subject to any disclaimer, the term of this patent is extended or adjusted under 35 U.S.C. 154(b) by 0 days.

(21) Appl. No.: 09/204,334

(22) Filed: Dec. 2, 1998

(51) Int. Cl.[7] .................................................. G06N 3/02
(52) U.S. Cl. ................................ 706/52; 702/54; 702/185
(58) Field of Search ................................ 706/52; 702/54, 702/185

(56) References Cited

U.S. PATENT DOCUMENTS

| | | |
|---|---|---|
| 4,894,795 | 1/1990 | Whitehouse et al. . |
| 5,333,240 | 7/1994 | Matsumoto et al. . |
| 5,353,233 | 10/1994 | Oian et al. . |
| 5,367,612 | 11/1994 | Bozich et al. . |
| 5,419,197 | 5/1995 | Ogi et al. . |
| 5,434,783 | 7/1995 | Pal et al. . |
| 5,517,737 | 5/1996 | Greene et al. . |
| 5,521,840 | 5/1996 | Bednar . |
| 5,533,383 | 7/1996 | Greene et al. . |
| 5,566,092 * | 10/1996 | Wang et al. ........................ 702/185 |
| 5,566,273 * | 10/1996 | Huang et al. ........................ 706/25 |
| 5,571,969 | 11/1996 | Kawasaki . |
| 5,579,232 | 11/1996 | Tong et al. . |
| 5,623,579 | 4/1997 | Damiano et al. . |
| 5,686,669 | 11/1997 | Hernandez et al. . |
| 5,698,788 | 12/1997 | Mol et al. . |
| 5,745,382 | 4/1998 | Vilim et al. . |
| 5,854,993 * | 12/1998 | Grichnik ........................... 702/54 |

OTHER PUBLICATIONS

Tse, P.; Wang, D.D., A hybrid neural networks based machine condition forecaster and classifier by using multiple vibration parameters, Neural Networks, 1996., IEEE International Conference on, vol: 4, Jun. 3–6, 1996, pp: 2096–2100 vol. 4.*

Bozich, D.J.; MacKay, H.B., Vibration cancellation at multiple locations using neurocontrollers with real–time learning, Neural Networks, 1991., IJCNN–91–Seattle International Joint Conference on, vol: ii, Jul. 8–14, 1991, pp: 775–780 vol.2.*

DiDomenico, E., Neural network output feedback training for optimal vibration suppression, Neural Networks, 1994. IEEE World Congress on Computational Intelligence., 1994 IEEE International Conference on, vol: 4, Jun. 27–Jul. 2, 1994, p: 2556–25.*

* cited by examiner

*Primary Examiner*—Mark Powell
*Assistant Examiner*—Wilbert Starks
(74) *Attorney, Agent, or Firm*—Rockey, Milnamow & Katz, Ltd.

(57) ABSTRACT

A system and a method for tracking long term performance of a vibrating body such as a gas turbine, includes a vibration sensor who time domain outputs are transformed to the frequency domain, using a fast Fourier transform processing. Frequency domain outputs are provided as inputs to a fuzzy adaptive resonance theory neural network. Outputs from the network can be coupled to an expert system for analysis, to display devices for presentation to an operator or are available for other control and information purposes.

37 Claims, 17 Drawing Sheets

LEARNING OF CERTAIN TURBINE

ONLINE OPERATION

RETRAINING OF SYSTEM

NEURAL NETWORK BASED ANALYSIS SYSTEM FOR VIBRATION ANALYSIS AND CONDITION MONITORING

FIELD OF THE INVENTION

The invention pertains to systems and methods of vibration analysis. More particularly, the invention pertains to such systems and methods which incorporate fuzzy adaptive resonance theory neural networks for distinguishing between normal and abnormal vibrations.

BACKGROUND OF INVENTION

Gas turbines engines and power generation, such as the General Electric LM2500, are used in numerous marine applications and for power generation. This harsh environment demands early detection and analysis of impending turbine failure in order to prevent catastrophic failures which may endanger personnel as well as shipboard equipment.

The current "state-of-the-art" monitoring equipment incorporates the Wigner-Ville Distribution (WVD). The WVD monitors the once-per-rev vibration energy of the turbine components.

The once-per-rev energy occurs at the frequency corresponding to the rotational velocity of the turbine. This type of system is being used by the US and Foreign navies to monitor the vibration of the LM2500 gas turbine.

The existing system incorporates acceleration sensors that are mechanically connected to the turbine casing. These sensors provide an analog signals suitable for analysis. These signals are then fed into a data acquisition system to filter and digitize the signal.

Sensor output signals are converted to the frequency domain. In one aspect, the conversion can be implemented using Fast Fourier Transform-type (FFT) processing. The frequency domain representation can be processed by deleting those frequency components known to be of little or no interest.

In addition, the amplitudes of negative frequency components can be set to zero. Inverse FFT processing can then be carried out to produce a time domain signal having only frequencies of interest and no negative frequencies.

The technique of isolating sections of the frequency domain signal to create only a few frequency components in the signal allows the WVD to be applied without any smoothing to reduce cross-term energy. The cross-term energy was controlled to occur in spectral locations that were not used in the analysis. This technique can be used in other analysis efforts with the WVD.

The WVD thus provides a highly accurate measure of the turbine vibration amplitude at any instant. This has been used as an important feature in a condition-based monitoring application.

As the vibration level changes under identical operating conditions, the change can be recorded and used as a measure of turbine health. Steadily increasing vibration levels indicate deteriorating turbine health.

The output of the WVD can be used with a thresholding algorithm to detect excessive once-per-rev (1X) vibration. Thresholding of the 1X vibration is used in many gas turbine installations. This allowed detection of deteriorating turbine condition. Ideally, the deterioration would be detected at an early enough stage to prevent catastrophic damage, and to schedule maintenance activities.

Complex signals have been processed by neural networks. One known form of a neural net is the Fuzzy Adaptive Resonance Theory, Fuzzy (ART) neural network.

This is a neural network architecture developed by Stephen Grossberg and Gail A. Carpenter of the Department of Cognitive and Neural Systems at Boston University. The network uses a resonance concept that involves comparisons of new inputs to information that is already learned.

If the new input is sufficiently close to the old information, then resonance occurs and the network will adapt to learn the new information. The first implementations of ART operated only on binary (0 or 1) data. The theory has been extended to accommodate analog input values of the range zero to one, using Fuzzy ART. The "Fuzzy" prefix implies that the input numbers are analog; no fuzzy logic connotations need be ascribed to the numbers. The system learns to recognize analog values within subsets of its total input space. The information that is presented to the network occupies a section of the input space corresponding to the amplitude of the information.

Fuzzy ART is called an unsupervised neural network because the training set is presented to the network without information as to the desired classification. Instead, the network forms an internal representation of the data presented to it.

While the known vibration analysis systems have generally been effective for their intended purpose, it would be desirable to improve the accuracy and extent of the analysis. In this regard, it would be desirable to be able to detect the presence of non-stationary frequency components. It would also be desirable to be able to eliminate frequency components not of interest.

It would also be desirable to be able to characterize, in some sense, a particular turbine and then monitor, over time the performance of that unit. In this fashion, deviations from expected performance should be detectable at an early enough stage to avoid the occurrence of catastrophic failures. Detected deteriorating performance can trigger unit maintenance.

SUMMARY OF THE INVENTION

A system and method for monitoring dynamic performance of an operating turbine utilizing at least one vibration sensor coupled to the turbine incorporate a pattern recognition subsystem. The output signals from the sensor can be transformed to a frequency domain using FFT-type processing. These frequency components can be used as inputs to a neural network.

The solutions to many data analysis problems have been shown to be non-algorithmic in nature. That is, they cannot be described or predicted through application of repetitive numerical manipulation or analysis.

An inability to analyze a signal can be caused by the presence of noise or minor variations in signal or sensor data. These kinds of analysis have been shown to potentially benefit from the application of systems that can detect patterns in a signal or signals. One class of such a system is the neural network. This is a system which can be trained to "recognize" certain characteristics or trends in a signal.

In a preferred embodiment, the neural network of the present system and method is the Fuzzy Adaptive Resonance Theory (Fuzzy ART) neural network. The Fuzzy ART is a type of adaptive resonance theory neural network that can examine new input data, and decide if its already-learned prototypes sufficiently match the input (resonate) and if so then the new input is learned.

This network architecture is very good at novelty detection and can perform quick learning of new localized data without destroying the other stored information. This property eases the implementation of an on-line monitoring system, because retraining can occur in near real-time, as opposed to other neural networks that must have lengthy retraining to incorporate new information.

A Fuzzy ART system as incorporated herein includes two major components, an attentional subsystem and an orienting subsystem. The attentional subsystem activates the system in response to the input vector. The orienting subsystem finds the correct internal representation of the new information.

Each input vector presented to the network enters through the Input Layer. The $F_0$ input layer preprocesses the input layer vector, a, extending the representation of the input vector to allow the network to represent ranges of input vectors in a single neuron, as opposed to storing just a single vector.

The $F_1$ activity layer determines the amount of activity present in the different neurons when an input vector is presented. In the $F_1$ layer, the input vector is compared with the stored prototype information, using fuzzy arithmetic, to determine how close the new vector is to the stored prototype.

The $F_2$ category layer retains the prototypes that are checked for resonance with the input vector. The $F_1$ and $F_2$ layers contain multiple neurons, but the $F_0$ layer contains one neuron. In FIG. 11, the activity layer weights are shown as $W_j$ and the prototype weights are shown as $w_j$.

In operation, the new input vector is compared, in the activity layer, $F_1$ to the long term memory (LTM) weights emanating from the prototype layer $F_2$. Short term memory traces (STM) are thus generated. The orienting subsystem checks these STM traces to find the most active neurons. The amounts of resonance are also checked. If the neuron with the most activation does not have sufficient resonance, the orienting subsystem resets the network and a new neuron is chosen for resonance testing. The chosen neuron then adapts to learn any new information in the input.

The neural network forms a multidimensional internal representation of the turbine operation. Operating conditions are learned and recorded in the neural memory. If new information that is close to the old information is learned, the network weights will modify slightly to adapt to the new data. For the weights to change, the new information must resonate with the old information already learned. The concept of resonance in fuzzy ART means that the information must be in close proximity to already-learned data. The degree of closeness is controlled by a parameter called vigilance.

In one embodiment, a turbine can be used for propulsion of a movable platform. Representative platforms include, without limitation, a marine platform, such as a boat or a ship, a land platform, such as a truck or a tracked vehicle, or an aircraft. The present vibration monitoring system can be carried by the respective platform coupled to the turbine.

In accordance herewith the system can be trained in general using data from normally functioning turbines of the same type as being monitored. Specific training using data from the actual turbine to be monitored can be used to bind the system to that particular turbine.

A visual display, coupled to the system, can be used to advise an operator of any developing, abnormal vibration patterns. A maintenance program can then be undertaken to correct the developing malfunction.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
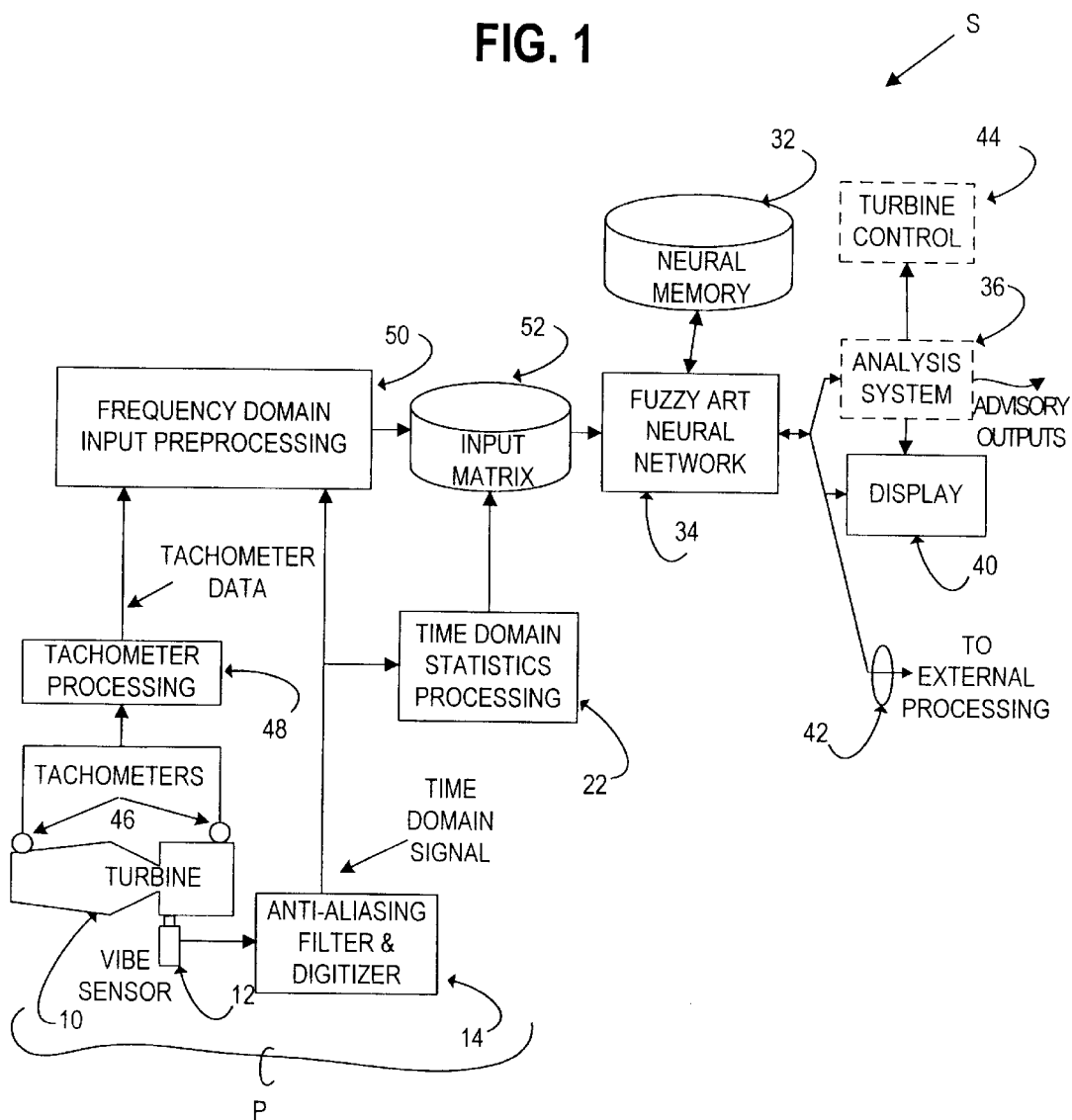
FIG. 1 is a block diagram of a system for monitoring an operating unit in accordance with the invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

This invention has applicability to many types of machinery, including jet engines, steam turbines, automobile engines, pumps, compressors, tank engine turbines, and gas turbines. In this description, the application of the invention to a gas turbine is described, in order to disclose a preferred embodiment and so as to enable one of skill to practice the invention. Other applications can be made by a person skilled in the art, based hereon, and familiar with the application area.

An overall block diagram of a system S is illustrated in FIG. 1. The system S is carried on a movable platform P. The P is moved through a respective sea, land or atmospheric medium by a turbine 10. An input preprocessing block is further described in FIG. 2, FIG. 3, and FIG. 4.

Vibrations from turbine 10 are sensed by vibration transducers 12. Transducer 12 generates a signal that is instantaneously proportional to a unit of vibration, whether displacement, velocity, or acceleration. Transducer 12 could be implemented as a laser non-contact interferometer system, a micro-electromechanical system, MEMS, sensor, a piezo-ceramic accelerometer, or other technology.

In this embodiment, and without limitation, transducer or sensor 12 is described as an accelerometer that produces an electrical voltage instantaneously proportional to the acceleration of the turbine at a given point in time. By the term 'instantaneously proportional' is meant that the output of the vibration sensor is not a statistically calculated value, such as root-mean-squared or average level of the vibration signal. Multiple sensors could be used if desired.

The vibration sensor 12 must have sufficient bandwidth to capture desired information that is available in the vibration spectrum of the turbine. This information may include turbine blade-pass frequencies, harmonics of blade-pass frequencies, turbine once-per-rev frequencies, and their harmonics.

Figure 5:
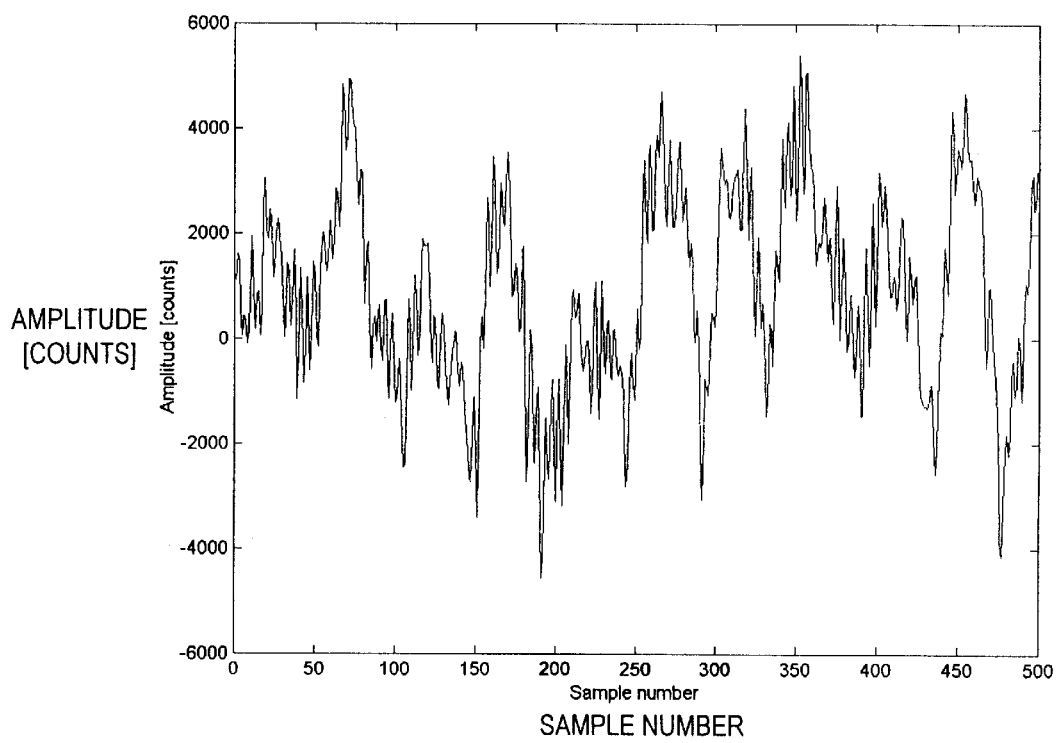
FIG. 5 is a graph illustrating a typical turbine vibration signal.

The signal emanating from the vibration sensor 12 is a time domain voltage signal having a form similar to that illustrated in FIG. 5. This signal is a time-domain composite of all the signals from each vibrating element in the turbine, that fall into the system's bandwidth.

The Filter and Digitizer 14 accept the time domain information and condition it for digitization using the following process:

1. Impedance match and amplify the vibration signal from sensor 12.
2. Low-pass filter the signal using an anti-aliasing filter. This removes high-frequency information from above the maximum vibration frequency being examined. The out-of-band frequencies will then not corrupt the in-band frequencies during the digitization process.
3. Digitize the signal using a suitable sampling rate and precision to gather all the frequency information in the signal. A representative sampling rate would be 40,000 samples per second, with 16 bits of resolution where the highest frequency component of interest corresponded to 20 kHz.

The filter could also be implemented as an analog/digital hybrid filter using over sampling and decimation.

The Tachometers 46 measure the exact speed that rotating elements in the turbine are turning. Various technologies may be used for these tachometers, in the case of an LM2500 gas turbine, the tachometers are implemented using a magnetic gear-tooth sensor, and adjusted to yield digital pulses at a rate proportional to the turbine rotational frequency.

These tachometer output signals are converted to a digital number in a Tachometer Processing Block 48. The digital tachometer values are updated each time the input digital signals are processed by the Fourier Transform 60 of FIG. 2.

Figure 2:
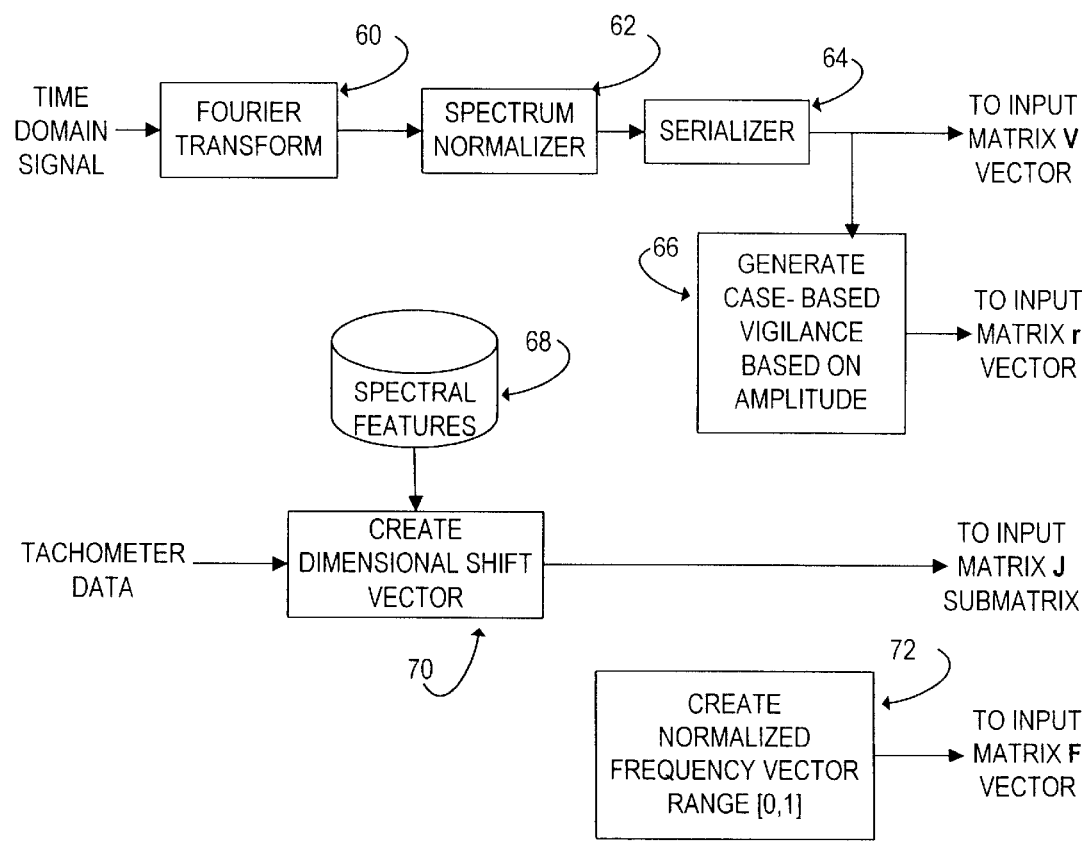
FIGS. 2–4 taken together are a block diagram illustrating details of the Input Preprocessing block of FIG. 1.

The Frequency Domain Input Preprocessor Block 50 is illustrated in FIG. 2. The input vibration signals and tachometer signals are prepared for analysis by the Fuzzy ART Neural Network 34 in the Frequency Domain Input Preprocessor. The outputs of the Frequency Domain Input Preprocessor are components of the Input Matrix 52 to the neural network.

The Input Matrix contains a serialized version of the input spectrum, normalized to an amplitude range of [0,1] and loaded into a vector within the Input Matrix. In one embodiment, there are 65536 frequency elements in the input vector.

The Input Matrix also receives a vector of frequency values that increment throughout all the frequencies covered by the normalized input spectrum. There is also a vector of individual case vigilance values that control the attention that the Fuzzy ART Neural Network devotes to each row in the Input Matrix.

The Input Matrix also contains a submatrix that shifts the neural memory dimension of individual rows in the Input Matrix to especially highlight certain key spectral components. This process will greatly increase the learning speed of the Fuzzy ART Neural Network.

Figure 3:
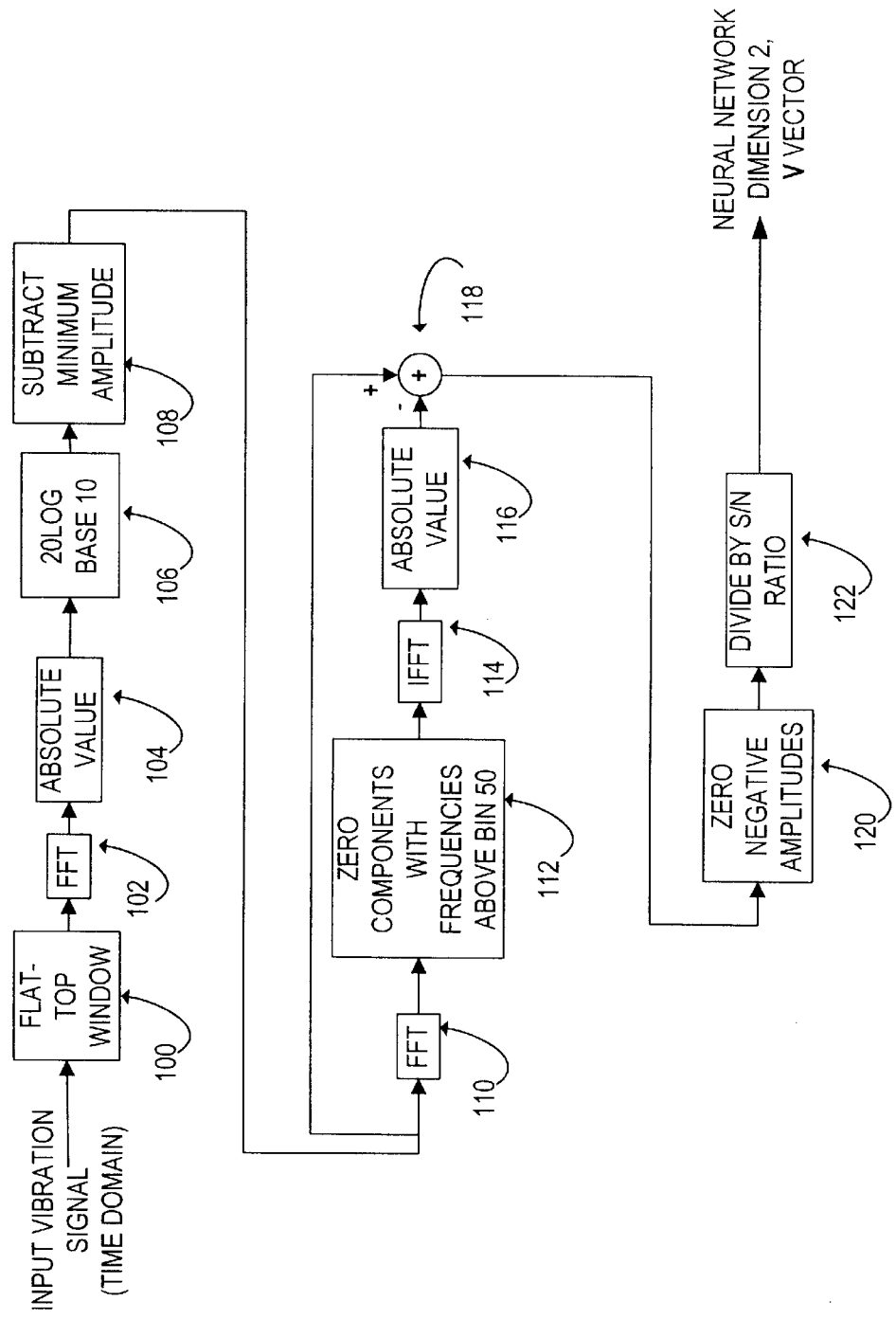

The internal algorithms and elements of the FIG. 2 processing of the time-domain input signal through to the Input Matrix V vector are illustrated in FIG. 3. These include the Fourier Transform 60, Spectrum Normalizer 62 and Serializer 64. The input signal is transformed into the frequency domain, using the Fourier Transform.

The frequency domain spectrum is then normalized to a [0,1] range in the Spectrum Normalizer 62. The spectrum is presented to the Input Matrix in a serial fashion, represented by the Serializer 64.

Before being input to the Fast Fourier Transform, FFT, 60, the time domain signal is windowed using a Flat-Top Window 100, see FIG. 3, to provide accurate signal amplitudes and minimize scalloping losses in the spectrum. The spectrum is converted from the complex number domain into real values by the Absolute Value block 104. Then the frequency-domain signal is converted into a logarithmic representation 106 and made unipolar positive in block 108. The signal spectrum now has a form as illustrated in FIG. 6.

Figure 6:
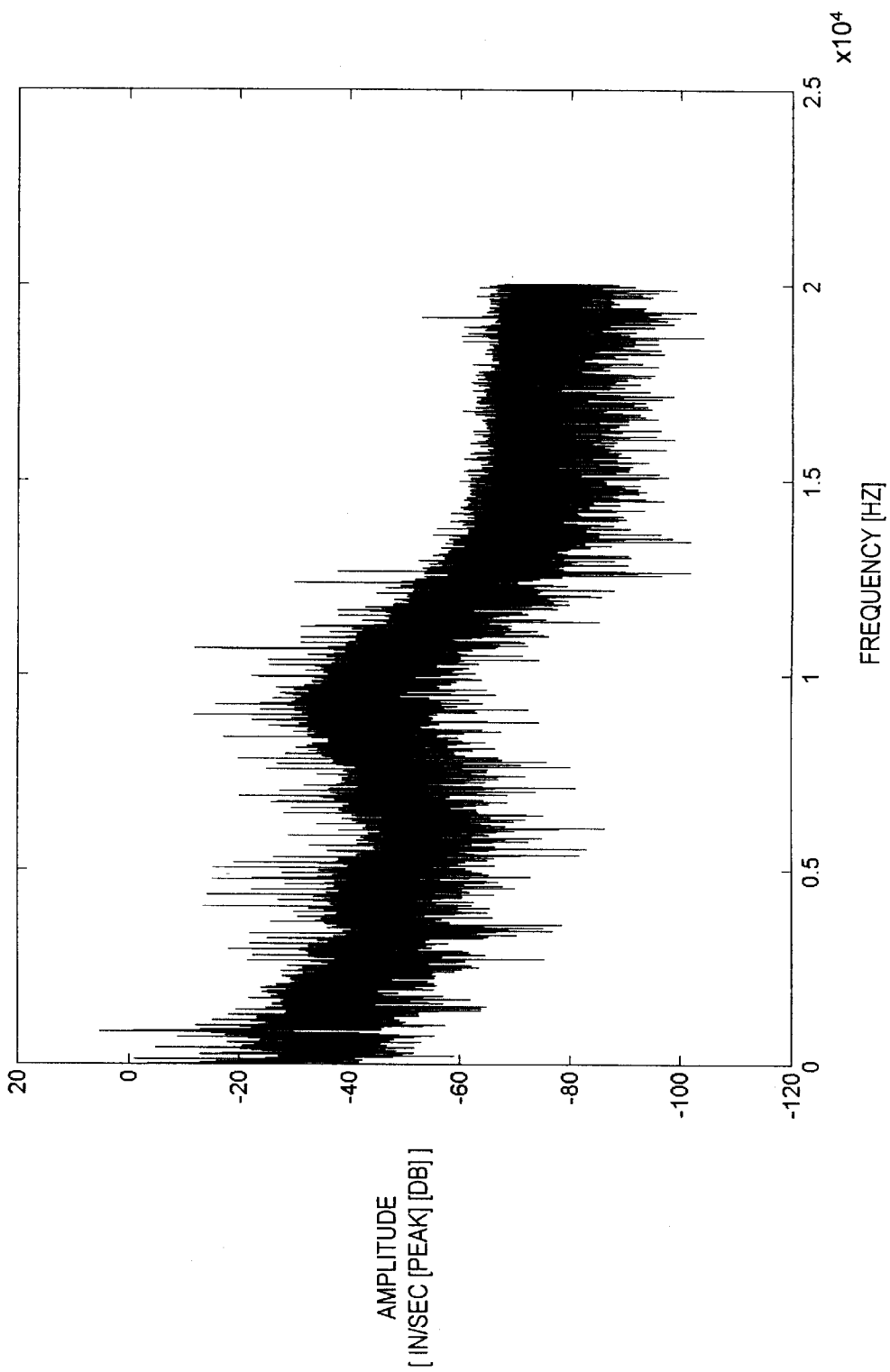
FIG. 6 is a graph of a frequency domain representation of the time domain signal of FIG. 5.

The wavy noise baseline of FIG. 6 is removed in the steps to normalize the signal for input to the neural network. The spectrum is duplicated and one spectrum is processed by taking the FFT 110 of the spectrum, subtracting high-frequency components 112, taking the inverse-FFT 114, and converting the spectrum to real numbers 116 to get from a frequency spectrum representation of the noise floor.

Figure 7:
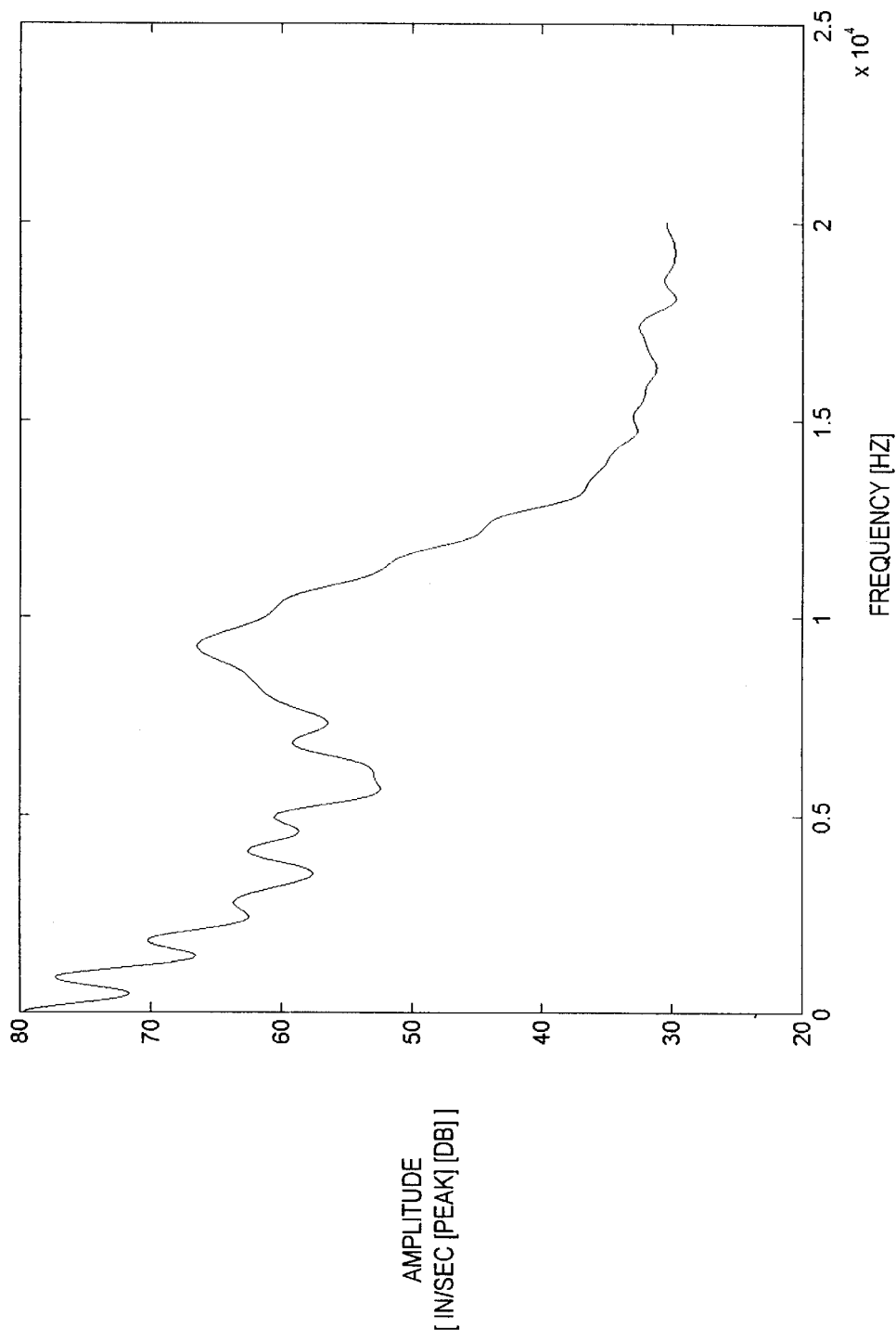
FIG. 7 is a graph of a frequency domain representation of the noise floor of the signal of FIG. 5.

The noise floor, calculated in this manner for the spectrum of FIG. 6 is illustrated in FIG. 7. The noise-floor is then subtracted 118 from the original spectrum to remove variations in the level of the noise floor. Because this subtraction is performed using a logarithmic representation of the spectrum, the resulting signal consists of just the signal to noise ratio, SNR(k), of each component in the spectrum at frequency k. All dependence on transducer calibrations, gain and offset are removed by this step.

Figure 8:
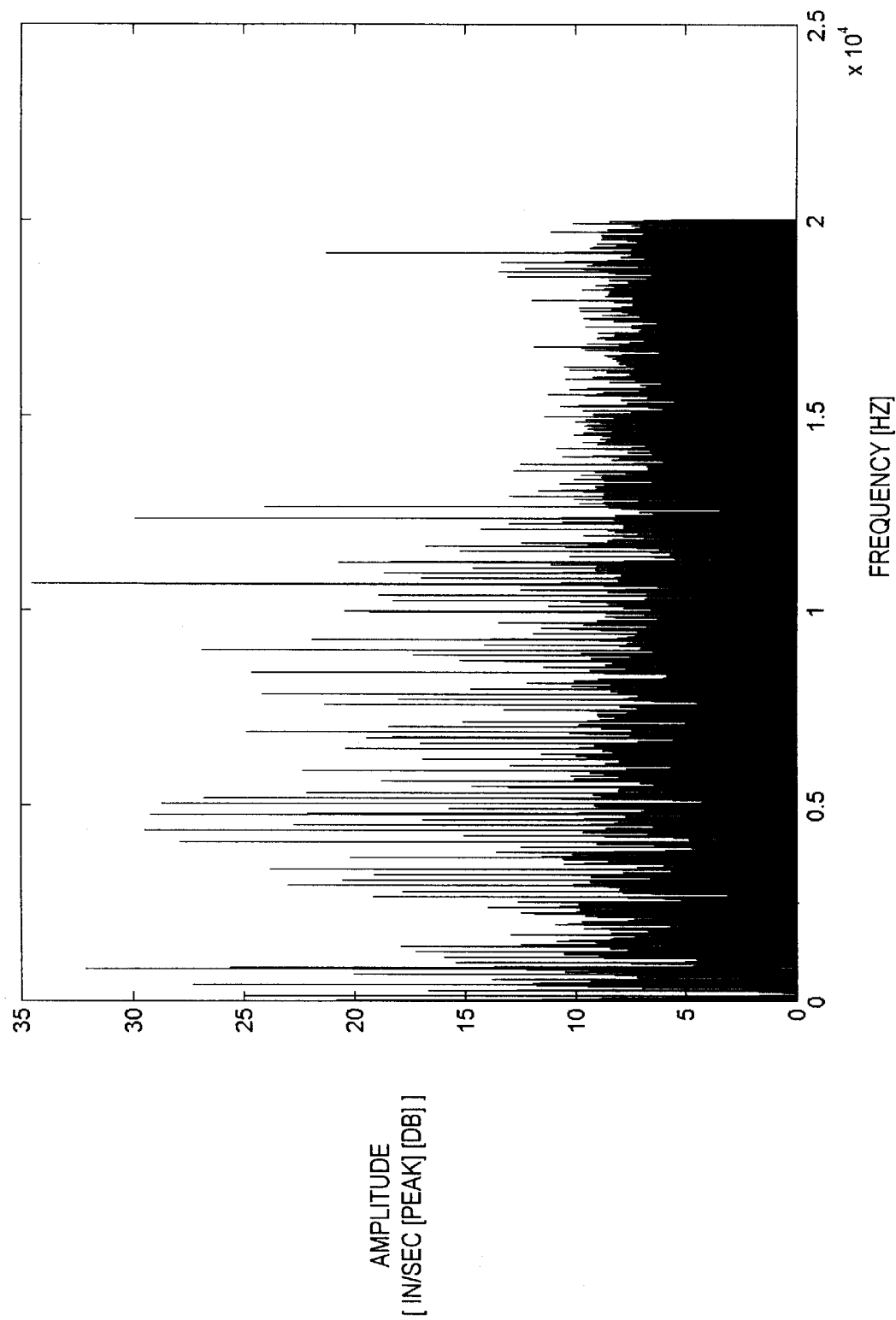
FIG. 8 is a graph of a frequency domain representation of the graph of FIG. 6 after additional processing.

All negative values are set to zero 120. These negative values are of the lowest amplitude noise, and not pertinent to the system processing. This establishes the zero-level noise floor. The signal spectrum now has a form as illustrated in FIG. 8.

Figure 9:
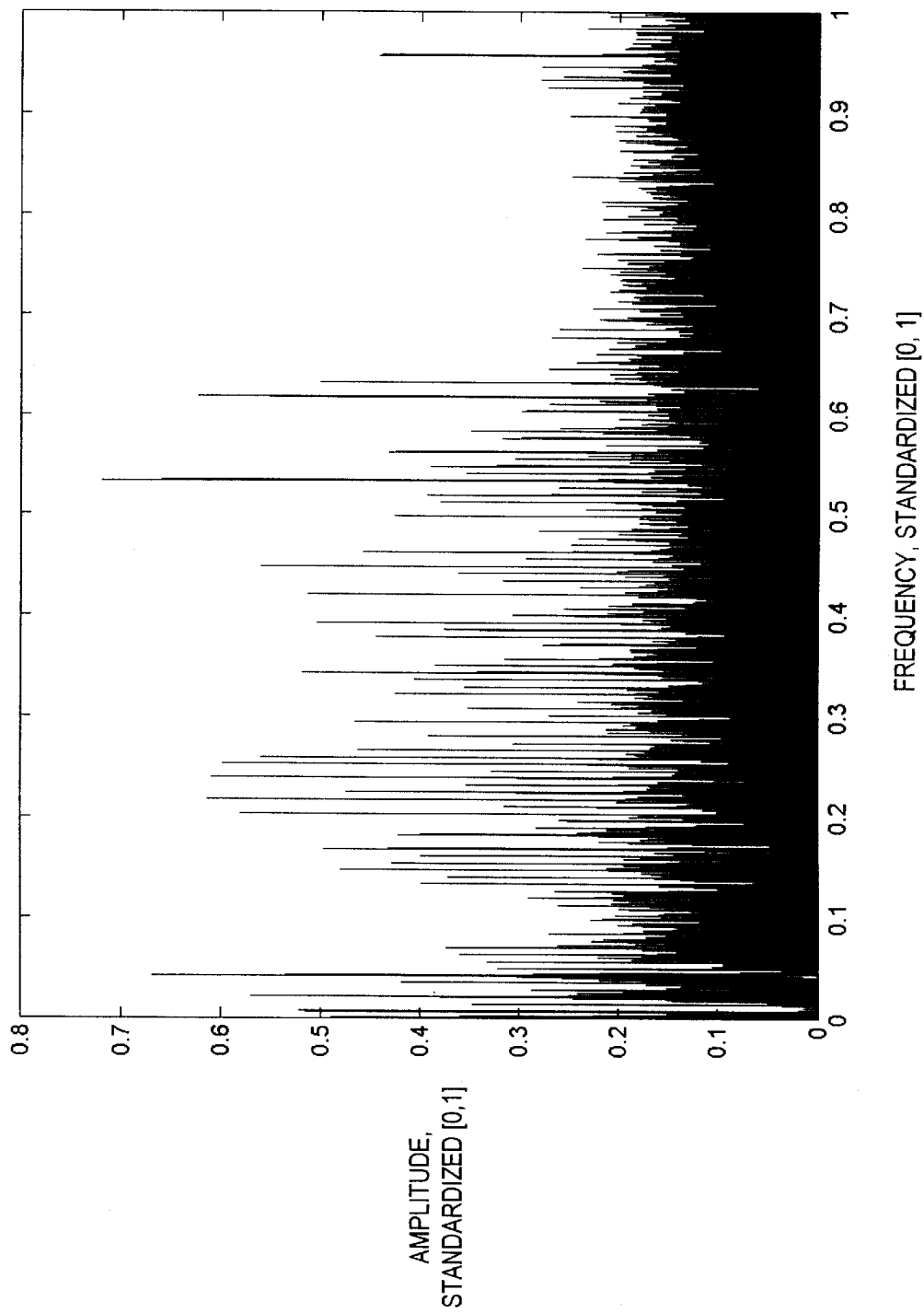
FIG. 9 is a graph of a frequency domain representation of a normalized version of the graph of FIG. 8.

To complete the signal standardization, each component of the spectrum is then divided 122 by the signal to noise ratio of the analog-to-digital converter circuitry to obtain a normalized signal with an amplitude range of [0,1]. The final normalized signal is illustrated in FIG. 9.

The normalized spectrum is stored in the Input Matrix as a vector of values, with the zero-th value corresponding to the DC or 0-Hertz frequency and the N-th value corresponding to the maximum frequency in the spectrum. In one implementation, the maximum frequency was 20 kHz, and there were 65536 components in the frequency spectrum.

Although there were 65536 components in the frequency spectrum, the use of cased-base vigilance results in the network requiring only 500 neurons to represent an entire 65536-point spectrum of turbine vibration. The vector in the Input Matrix was designated V to signify the vibration signal vector.

For processing in the Fuzzy ART Neural Network 34, individual case-based vigilance (also called indivigilance) values are determined for each component of the resulting spectrum, based on the amplitude of the component. The use of individual case-based vigilance enables the neural network to substantially completely ignore values that were of a low-enough amplitude to be within the noise floor, while paying close attention to higher amplitude information that may contain necessary spectral information.

The cutoff for the noise floor was taken as a value at the point tangential to the knee of a histogram of signal amplitudes. Above the knee, the amplitudes were more signal-like and below the knee, the amplitudes were more noise-like.

In the illustrated embodiment, two different levels of individual case-based vigilance were used, one for signal-like, and one for noise like. Varying levels of indivigilance could also be used depending on the signal amplitude, or other information pertinent to the signal, such as its frequency. The indivigilance was stored in the Input Matrix in the r vector, in parallel with the vibration vector.

With reference to FIG. 2, the tachometer data was used by the Create Dimensional Shift Vector Block 70 to indicate the frequencies at which the turbine is spinning. Many features in the spectrum are directly related to these features, including once-per-rev vibration, blade-passing frequencies, gear mesh frequencies, sidebands of blade-pass frequencies, and oil-whirl. Some features in the spectrum tend to occur at certain fixed frequency ranges, such as combustion noise.

The use of dimensional shift enables the neural network to separate the information pertaining to these features into separate sections of memory. In this way, the network will not confuse these special inputs with other spectral elements.

The Spectral Features Memory 68 defines where these features exist in the spectrum. The dimensional shift is provided through a J matrix that is parallel to the other vectors in the Input Matrix.

Figure 4:
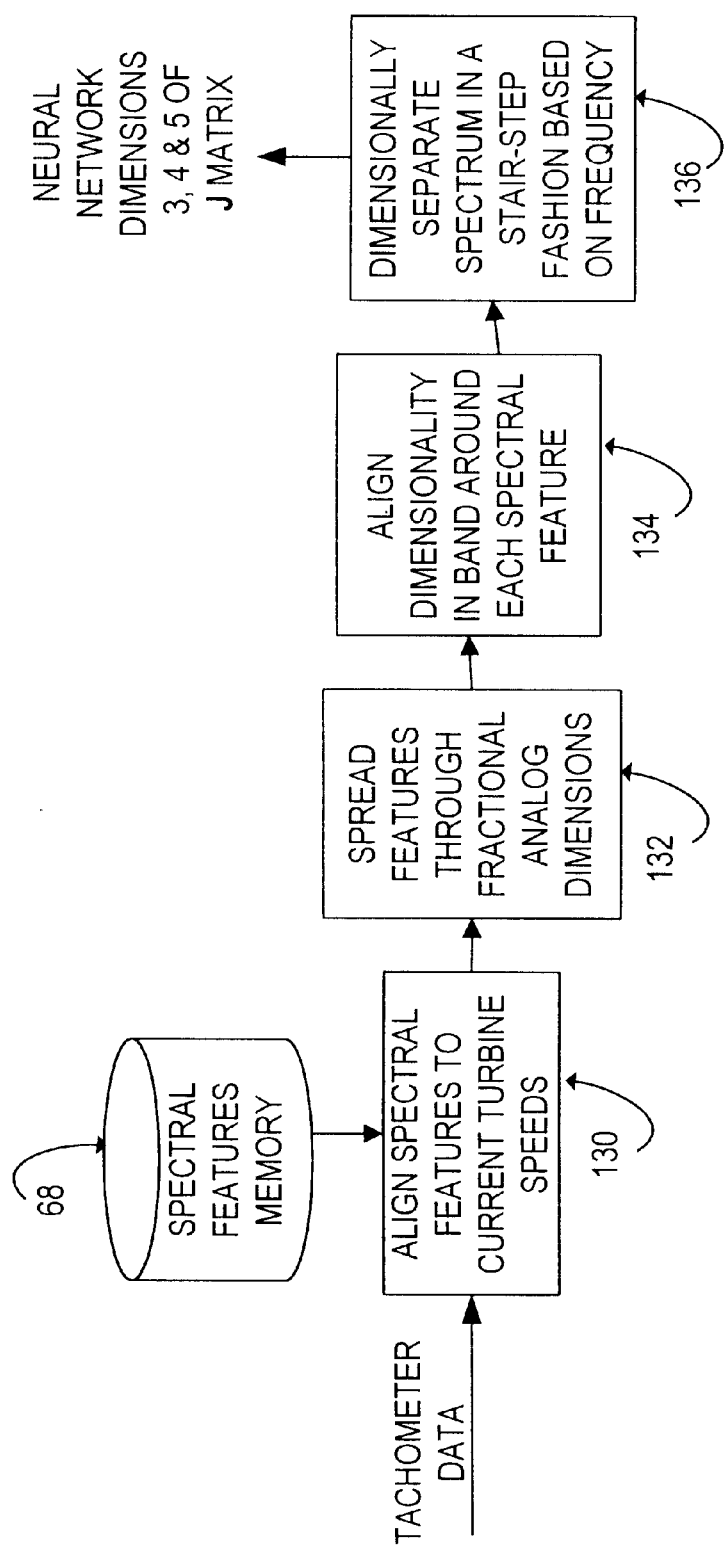

For the spectral features that occupy frequency bands that move in the spectrum with respect to the turbine speed, as sensed through the tachometers, the features are aligned using the Current Turbine Speed Block 130, see FIG. 4. The spectral components of the features are separated, block 134, by a dimensionality offset in a certain bandwidth around each feature.

Figure 10:
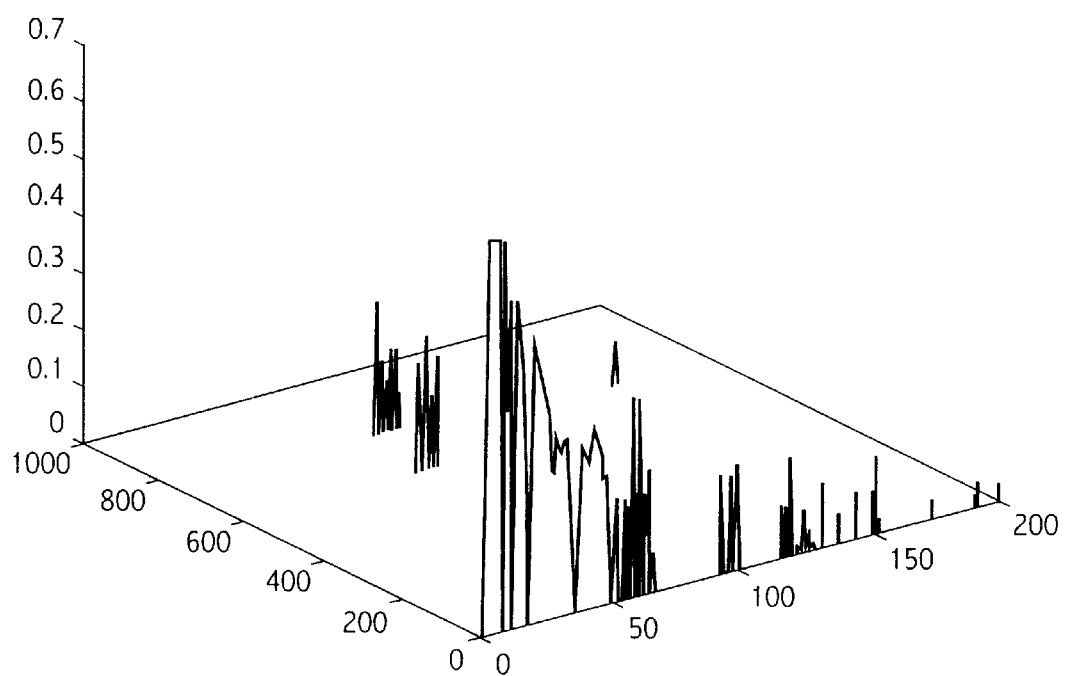
FIG. 10 is a multi-dimensional graph of separation of frequency components.

An example of the separation of frequency spectrum information using dimensionality shift is illustrated in FIG. 10. The a priori coding dimension of FIG. 10 is a linear representation of the multidimensional shift of different spectral components in the input to the neural network. The term 'a priori' signifies that it modifies the input to the neural network based upon previously known facts, such as the spectral features. Various sections of the spectrum are separated by a shift in the a priori coding dimension.

Sensitivity to changes in the spectrum is an implementation choice. In one embodiment, the sensitivity was chosen to be 5%, such that a change of 5% of full-scale of any component in the input spectrum, above the noise floor, would be detected. This parameter, along with the number of Input Matrix dimensions, controls the vigilance values for the network. The vigilance required to detect a certain percentage change is $$\frac{M - \Delta}{M} < \rho$$

$$\frac{5 - 0.05}{5} < \rho$$

$$0.99 < \rho$$

where M is the number of input dimensions, and $\Delta$ is the change amount with 0.05 corresponding to a 5% change. The individual case-based vigilance is shown as $\rho$. This equation shows that $\rho$ must be greater than 0.99 to detect a 5% change in amplitude of a frequency component.

A dimensional shift is also created in a stair-step manner, 136 of FIG. 4, at periodic frequencies to help ensure separation of the information at those frequencies in the neural memory. The frequency period chosen for incrementing the dimensional shift was smaller than the smallest sideband separation that was expected in the spectrum. This stair-step fractional-dimension shift allows the Fuzzy ART neural network to learn the input information very rapidly because vigilance trials in the network are reduced.

The dimensional shift is implemented as a small arithmetic change in the value of the input vectors that make up the J matrix. The spectral features are spread to different locations in neural memory using fractional analog dimensions 132 of FIG. 4.

Because the inputs to the Fuzzy ART Neural Network are analog numbers of the range [0,1], the change in the dimension can be made to be smaller than a binary jump from 0 to 1. A fraction of a dimension is all that is required to implement a change greater than the sensitivity, $\Delta$, of the system. There are 20 increments of 5% within the range [0,1]. Thus, for a 5% change, a step of $\frac{1}{19}$ was chosen to exceed the $\frac{1}{20}$ step indicated by 5%.

There are multiple vectors in the J matrix. When the first vector overflows, the next vector is incremented by $\frac{1}{19}$, and the first vector is again run up through the range [0,1]. This allows an arbitrary number of fractional-dimension shifts to be made while requiring only d/j vectors in the J matrix, where d is the number of separations in neural memory required, and j is the modulus, or number of fractional-dimension shifts capable of being fit into a single dimension (19 in this case).

The Frequency Domain Input Processing section also creates an F vector in the Input Matrix. This vector is just a monotonically increasing vector 72 over the normalized range [0,1] to indicate the frequency corresponding to each row in the Input Matrix.

The Input Matrix 52 serves as the input to the neural network for both training and on-line operation. The Input Matrix has the form:

$$I = |F\ V\ J|,r$$

$$I = |F\ V\ J|,r$$

$$= \begin{vmatrix} F(1) & V(1) & J(1,1) & J(1,2) & J(1,3) \\ \vdots & \vdots & \vdots & \vdots & \vdots \\ F(p) & V(p) & J(p,1) & J(p,2) & J(p,3) \\ \vdots & \vdots & \vdots & \vdots & \vdots \\ F(P) & V(P) & J(P,1) & J(P,2) & J(P,3) \end{vmatrix}, \begin{vmatrix} \rho(1) \\ \vdots \\ \rho(p) \\ \vdots \\ \rho(P) \end{vmatrix}$$

where
I=Input Matrix of input cases
r=vector of case vigilances
F=vector of frequencies from spectrum
V=vector of vibration velocities from spectrum
J=matrix of fractional—dimension separations
$\rho$=individual case vigilance
P=number of input cases in I The Time Domain Statistics Processing 22 provides further dimensions to the Input Matrix, if desired, to hold information pertinent to the signal statistics, such as : average, peak-to-peak, and root-mean-square (rms) values, crest factor, K-factor and kurtosis. These features help to classify the spectrum. These features will not change throughout the spectrum, and serve as a constant value over the processing of an Input Matrix particular to a given frequency spectrum.

The Fuzzy ART Neural Network 34 is a type of Adaptive Resonance Technology, ART, neural network, modified in this case to accept individual case-based vigilance values, and to indicate when a novel case has been detected. Through the careful setting of the vigilance values, the network will detect a specified amount of change in any frequency spectrum or time domain component.

The Fuzzy ART Neural Network is an established technology. Its use will be described here, as well as the modifications made to accomplish the requirements of this vibration analysis system. A short description of the network follows.

A Fuzzy ART system consists of two major components, the attentional subsystem and the orienting subsystem. The attentional subsystem activates the system in response to each input vector, and the orienting subsystem finds the correct internal representation of the new information. Each Fuzzy ART input vector is a row from the Input Matrix 52. The entire Input Matrix supplies all the training vectors for a single spectrum.

Fuzzy ART creates two internal representations of vectors presented to the system. There is a long-term memory (LTM) layer that represents information that the system has learned and a short-term memory (STM) layer that perceives and internalizes new cases presented to the system.

The long-term memory is stored in neurons, that are also called processing elements (PEs), or nodes, contained in the $F_2$ layer. The short-term memory is formed by neurons in the $F_1$ layer.

The long-term memory neurons hold categories or templates that consist of hyper-cubic areas that encompass the region of the input space representing the category of information that it has learned. The short-term memory tests the input vectors for degree of match between the long-term memory and the input vector. The long-term memory makes up the Neural Memory 32 of the system.

Figure 11:
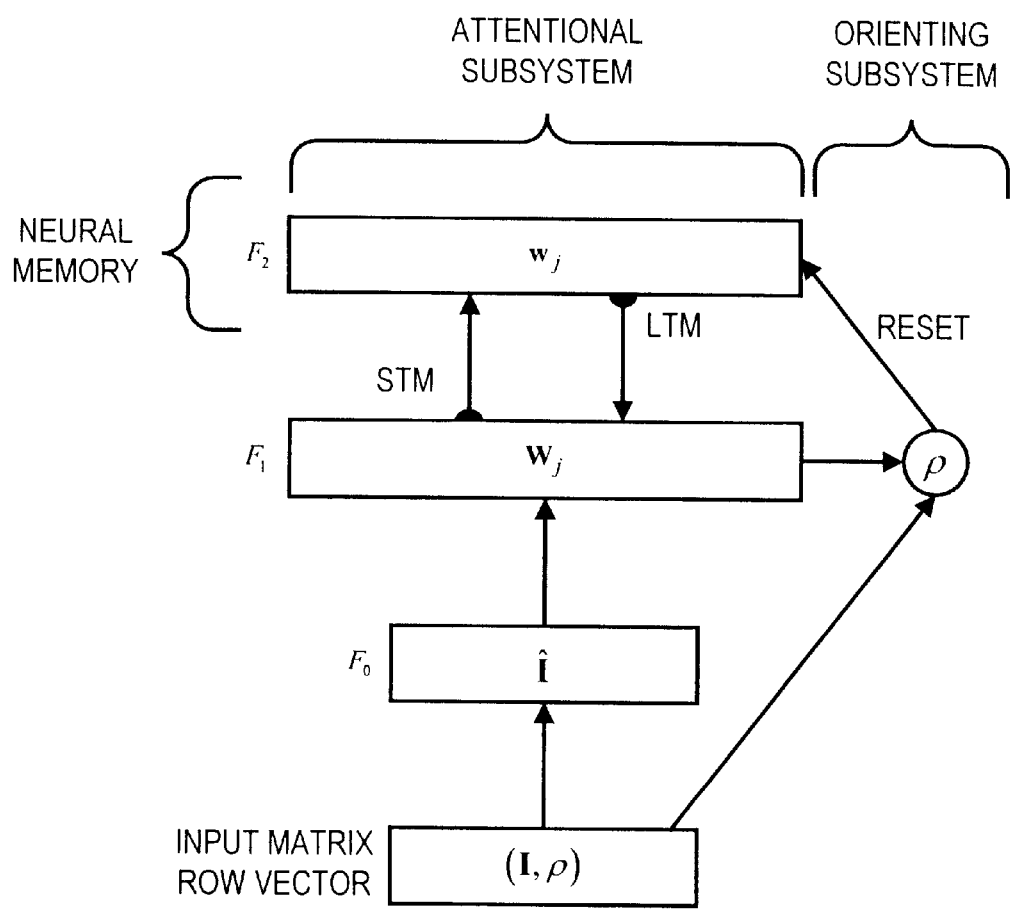
FIG. 11 is a block diagram of Fuzzy ART layers.

FIG. 11 illustrates the different Fuzzy ART layers, the short-term memory $F_1$ layer, long-term memory $F_2$ layer, the attentional subsystem, and the orienting subsystem. The $F_0$ layer shown in FIG. 11 provides preprocessing of the input vector to allow both low-amplitude and high-amplitude information to affect the network in the same manner. The input layer and the $F_0$ layer both consist of a single PE containing a vector representation of the input case.

The $F_1$ and $F_2$ layers each contains a set of PEs. The $F_2$ layer contains the same number of PEs as the $F_1$ layer. Each PE in the $F_1$ and $F_2$ layers contains a vector of weights of the same dimensionality as the processed input vector $\hat{I}$ in the $F_0$ layer. The number of weights in $\hat{I}$ is twice the number of dimensions in the input vector I, due to complement encoding where each input value is subtracted from one to monitor positive going and negative-going changes, as per Fuzzy Art theory.

The top-down weight vectors in the $F_2$ layer are called $w_j$, with the j subscript signifying the neuron index number in the $F_2$ layer. The bottom-up weight vectors in the $F_1$ layer are called $W_j$, with the j subscript signifying the PE index number in the $F_1$ layer. For each $F_2$ node, $w_j$, there is a corresponding $F_1$ node, $W_j$. The $W_j$ weights are the short-term memory traces, (STM) and the $w_j$ weights are the long-term memory traces, (LTM).

FIG. 11 includes vigilance denoted by $\rho$. The vigilance controls how close the system pays attention to the input vector. Generally, the vigilance is set to a constant for the whole training set. This makes all patterns equal in regards to how closely the system learns the individual vectors. By using a priori knowledge about the distribution of the input information, the amount of vigilance that each vector gets can be set on a per-case basis before input into the neural network. The case vigilance for input to the neural net can be set by hand, or modulated algorithmically, based upon features from the input case.

Applying the input matrix to the Fuzzy ART neural network allows the network to detect all the information in the spectrum, and make classification regions around each point in the spectrum. The internal neural memory representation of a learned spectrum can be seen in FIG. 12, which shows the classification regions superimposed on the normalized spectrum.

Figure 12:
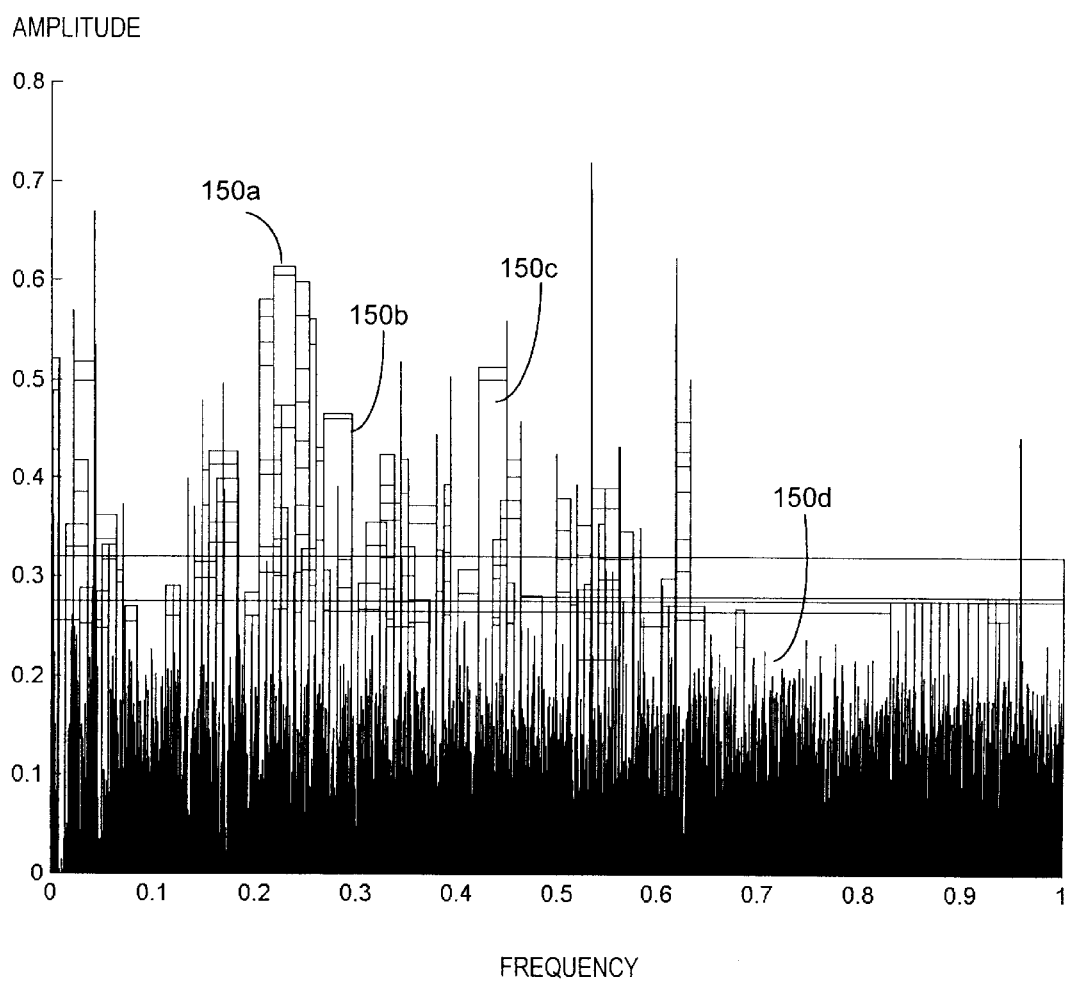
FIG. 12 is a graph of an internal neural memory representation of a learned spectrum.
Figure 13:
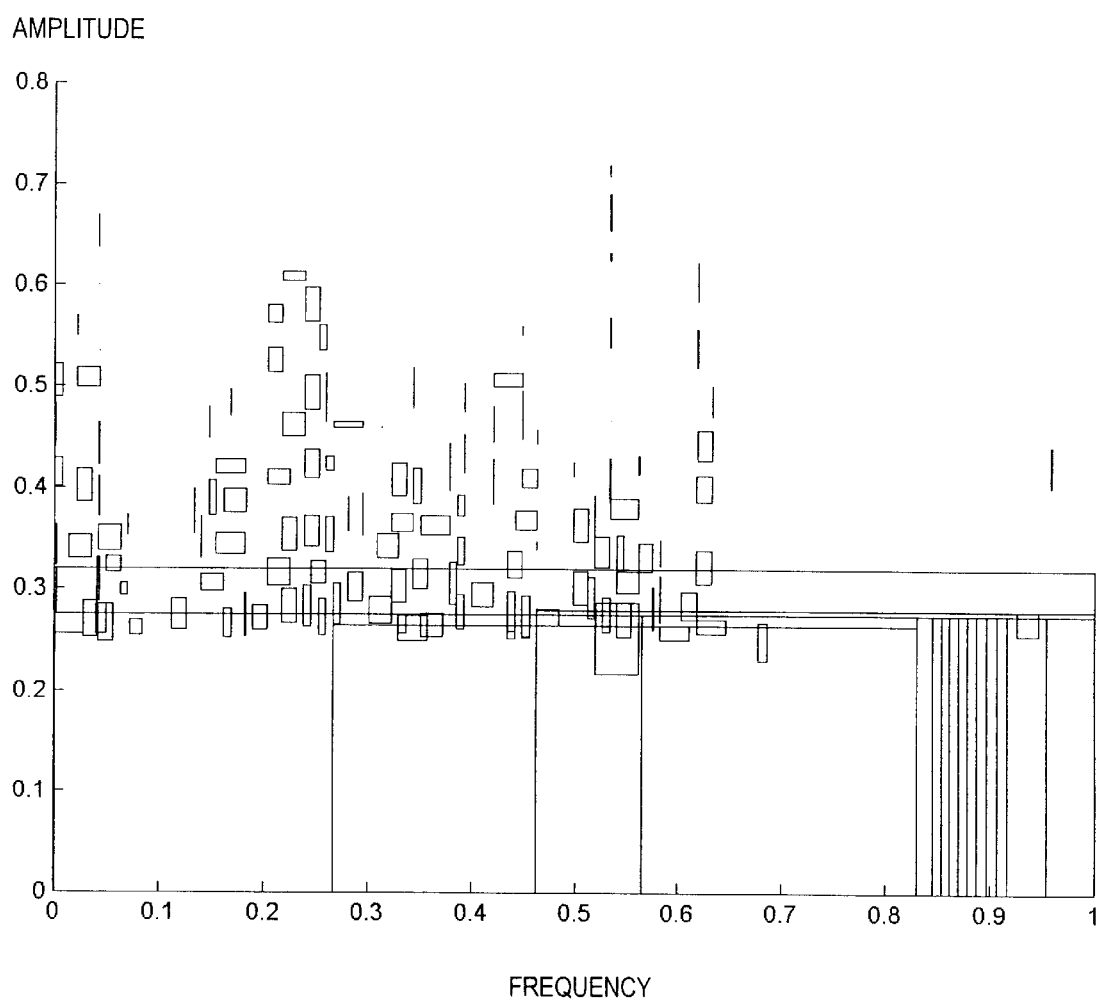
FIG. 13 is a graph based on the graph of FIG. 12 wherein the spectrum has been suppressed.

In FIG. 12, many small boxes i.e. 150a, 150b, 150c, are constructed by the network around the higher amplitude peaks in the spectrum. Larger boxes, i.e. 150d, are constructed around the noise information because noise information was learned with a lower vigilance value. A trace from neural memory without the superimposed spectrum is illustrated in FIG. 13. Dimensionality shifts are not illustrated in these figures for clarity.

After a spectrum has been learned by the neural network, changes in the spectrum are detectable. These changes are detected through the novelty-detector capability of the Fuzzy ART neural network.

Figure 14:
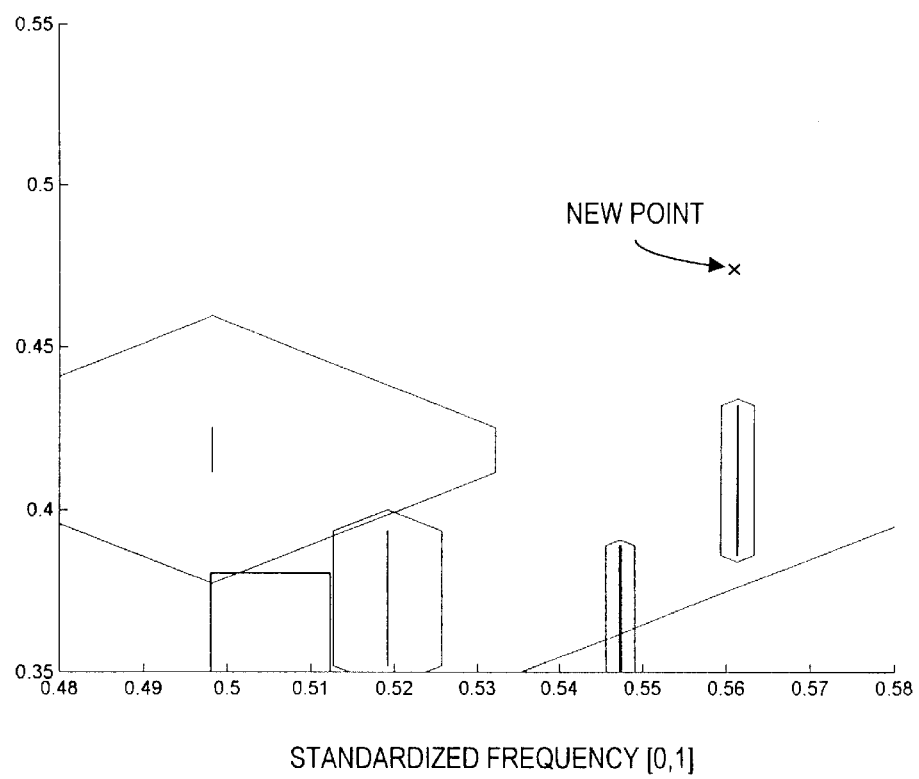
FIG. 14 is a graph indicating that a spectral change has occurred.

FIG. 14 is a diagram illustrating a change, labeled "new point", that has exceeded the classification region for a small section of the frequency spectrum. This is a change in a single element of the spectrum. This could indicate a catastrophic event such as a turbine blade crack, or a change of blade-set vibration over time.

The system S takes advantage of a more sophisticated form of neural network, the Fuzzy ART, to permit fast incremental training without loss of previously learned information. New data, detected by the network, modifies only a small portion of neural memory as opposed to requiring retraining of all the network weights as would occur in a back-propagation type of neural network. The learning characteristics of the Fuzzy ART neural network have been carefully characterized in order to prove the ability to detect a given change in spectrum components.

The ability to detect changes in any component of the frequency spectrum allows a detailed condition-based maintenance program to be established. The turbine could be serviced when its parts start to wear.

With reference to FIG. 1, the Analysis System 36 accepts all the detected change data that occurs in on-line use of the turbine. The change data is correlated with the spectral features, or maintained as an unpredicted phenomemon. Increasing trends in spectral components can indicate need for maintenance action. A fast-changing trend in turbine vibration, that greatly exceeds the previously learned classification regions, can indicate a catastrophic event that should precipitate immediate action. These events would be determined in the Analysis System and transmitted to the Turbine Controller 44 for alarm or emergency shutdown of the turbine.

This system provides improved analysis of detailed spectra. Prior art has used acceptance regions that were overlaid on the spectrum. These acceptance regions were based upon human expert knowledge and consisted of a limited number of amplitude thresholds for different bands of the spectrum. If the vibration exceeded one of these thresholds in a certain band, an alarm would be raised.

In the present system, the acceptance regions are learned automatically. They consist of the entire manifold of classification regions in neural memory. These classification regions are bound directly to the turbine to which the system is attached.

Figure 15:
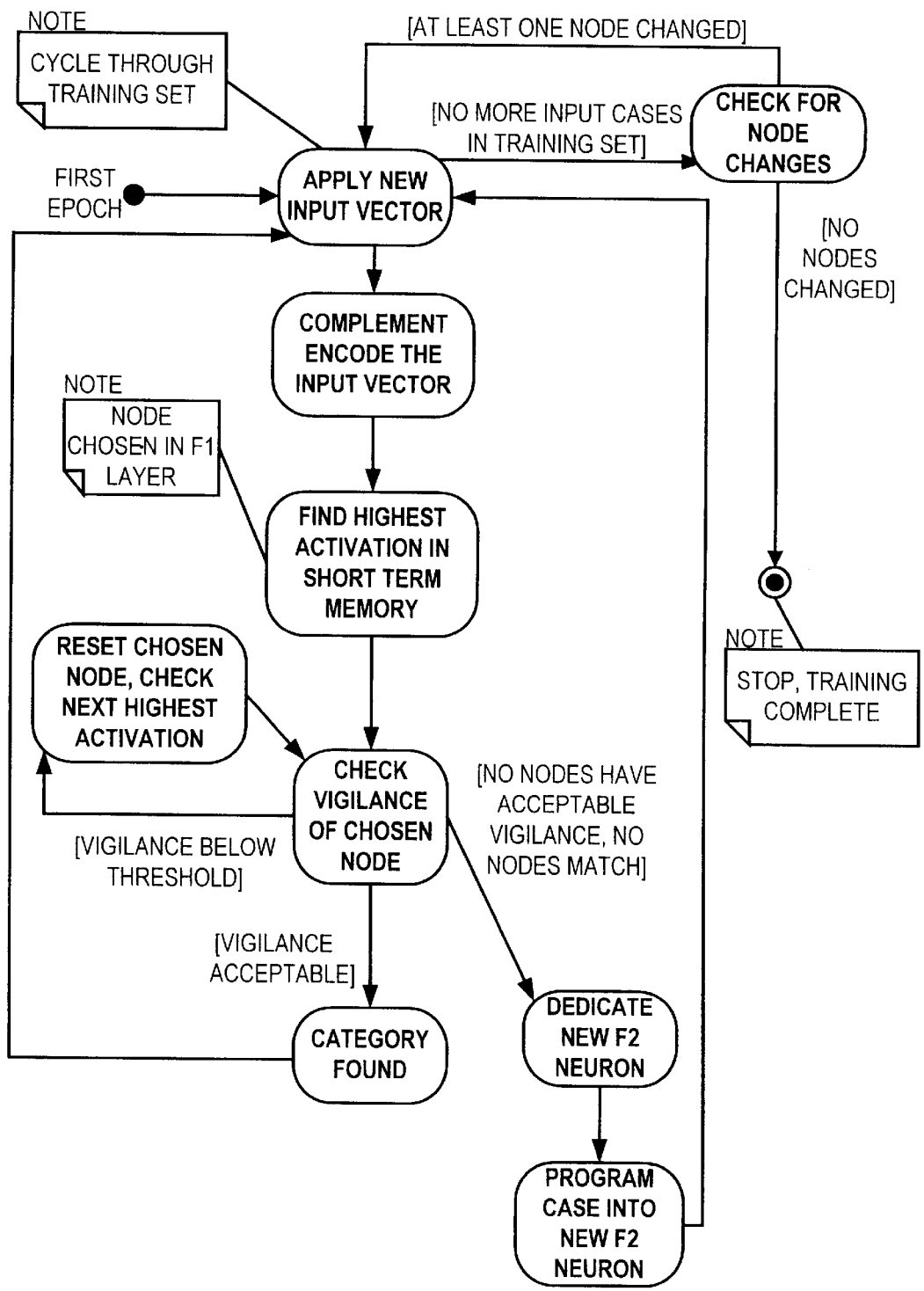
FIG. 15 illustrates a training process for the network.

FIG. 15 illustrates a Fuzzy ART algorithm for training the system S. The system is trained using vibration data from a turbine that is correctly operating, and installed in its intended environment. The classification regions are created in neural memory as the turbine is operated over its entire range of operating points. The information is stored in dimensionally separate locations in neural memory.

As the system S is operated on-line with the turbine, the analysis region in neural memory is dynamically shifted as governed by the turbine operating point. Therefore, the turbine acceptance regions in the new system encompass the entire turbine operating envelope, thus increasing the coverage of the monitoring capability. The dependence upon a human operator to manually determine acceptance regions is removed.

From experiments with a preferred embodiment of the system S, the entire 65536-point frequency spectrum required only 500 neurons to learn to detect 5% changes in the spectrum. This is a large compression of the data, but all spectral points are encompassed by classification regions. To learn the entire turbine operating envelope has been estimated to require 3 Mbytes of memory. This memory would be implemented in nonvolatile fast memory.

The system S can monitor thousands of components in the spectrum, and detect changes throughout the spectrum, not just at a few predetermined frequencies. It is highly tuned to an individual turbine, and would remain with the turbine through long periods of operating lifetime.

Figure 16:
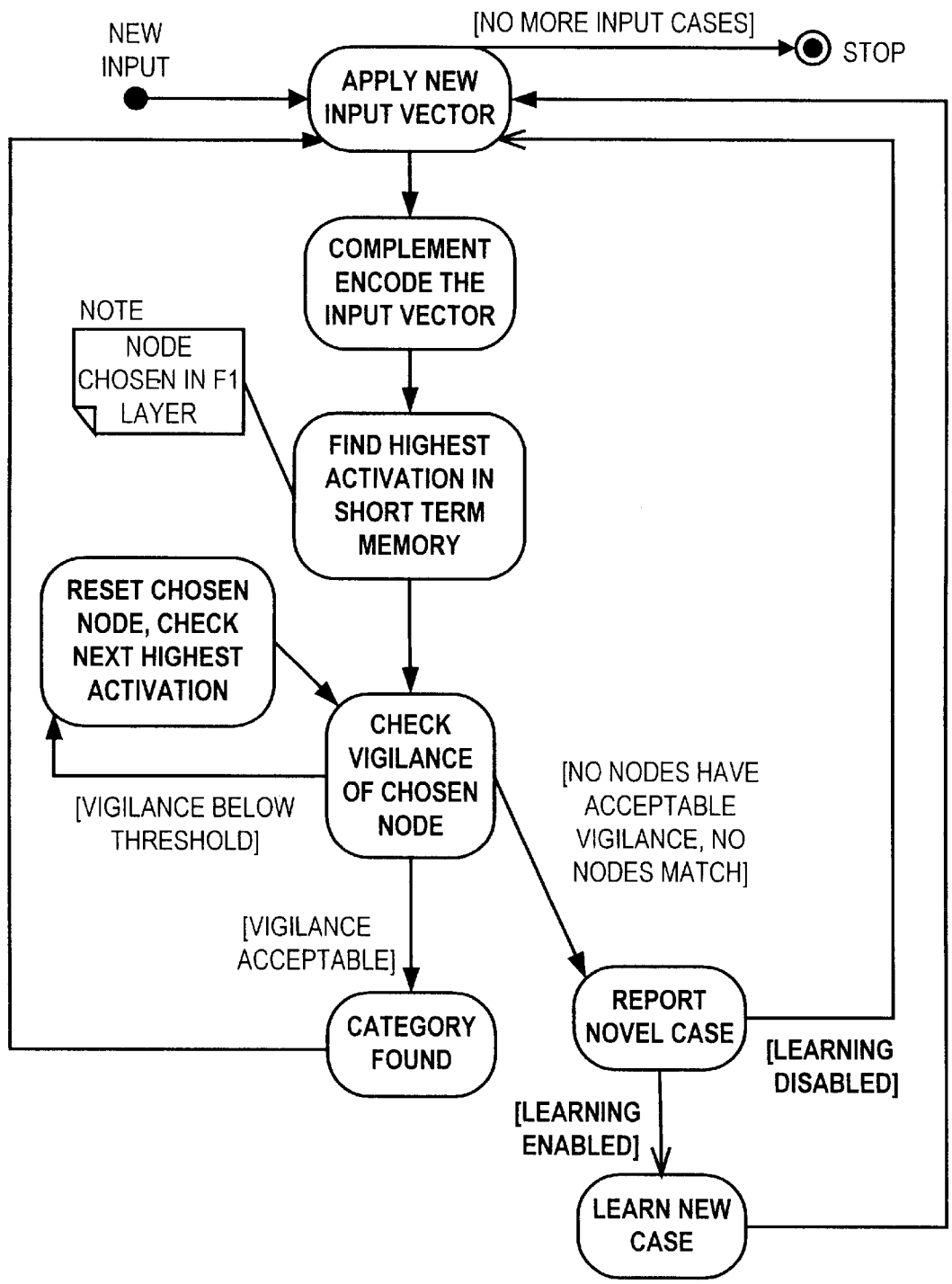
FIG. 16 illustrates a process for monitoring trends in an operating unit.

As the turbine components wear through use, the analysis system detects trends in vibration response of components in the spectrum. Trends are detected by monitoring the novel cases in the input spectrum, as illustrated in FIG. 16.

The novel cases can be learned in order to provide on-line adaptation to changes in the turbine spectrum. Increasing trends in blade-pass vibrations can indicate damage to the blade-set, as can increasing sidebands related to the blade-pass frequencies. The trending system may be constructed using an expert system to determine if known scenarios in the trends are present, indicative of excessive wear. Other technologies include fuzzy logic detector systems to gauge the amount of wear present, as gauged by the changes in spectral component amplitude. The amount of wear present in various components can be summed to give an overall estimate of turbine health, with a threshold provided for the initiation of maintenance actions.

Figure 17:
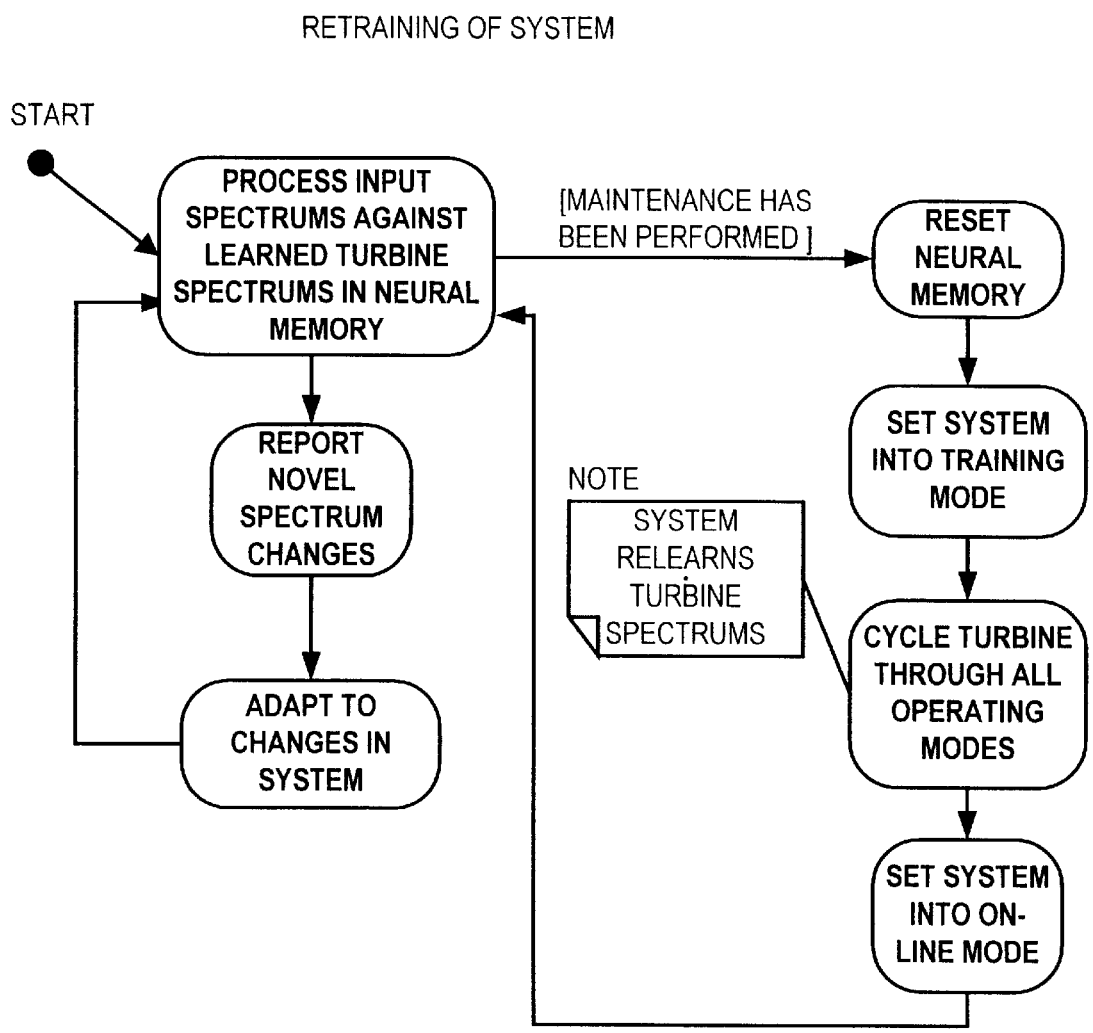
FIG. 17 illustrates a process for retraining the network subsequent to conducting maintenance on the unit.

After maintenance actions have been taken to correct turbine damage or wear, the system S will be automatically retrained with the new turbine spectral signatures by resetting the neural memory and running the turbine through its various operating modes. This process is illustrated in FIG. 17. The retraining enables the system S to adapt to any changes in the spectrum resulting from the maintenance action.

A Display System 40 that is driven by the neural network output and/or analysis system can display the current operating condition of the turbine, the accumulated changes in various spectral components since the turbine spectrum was first learned, and any alarms, predictions, or trends detected by the analysis system. The display can enable a human operator to distinguish between a normal operating condition of the turbine, and a damaged or deteriorating turbine, based upon highlighted changes from the baseline spectrum.

Outputs 42 to external processing, illustrated in FIG. 1, can include data related to individual turbine wear, or damage. The data can be collected and combined with operating data from multiple turbines to create a general library of operating characteristics of a class of turbines.

Because the data has been collected from identical monitoring systems, such as the system S, the information is easily combined in training sets. Data related to many types of turbine malfunctions can be collected. This will enable more accurate, automatic diagnosis of turbine faults as the combined data is disseminated to the monitoring systems in service.

Malfunctions in the turbine that can be distinguished in the vibration spectrum can be collected and tagged as appropriate to the malfunction. The information would then be trained in the neural network. When the appropriate neurons are activated, an output would be transmitted to the analysis system to indicate that a known problem has been detected.

The system S can be implemented on a single digital signal processing, DSP, circuit card. All neural processing can be done using a DSP microprocessor, accessing memory on-line, with an ethernet connection to external processors.

The system S can alternately be implemented within a general purpose desktop or laptop computer, using internal RAM for storage while providing communication and display capabilities intrinsic to the computer. A signal acquisition and digitization system can be installed in the computer or interfaced to the computer from an external electronics module. Alternative, separate processing units could be created for each of the subsystems, including FFT, Neural Net, Analysis System, and analog processing.

Desktop computer installations would be suitable for power-plant operation. Embedded and ruggedized implementations would be appropriate for aerospace propulsion engine use, such as for jet aircraft, and marine ships.

External processing and data archival systems could be set up for the purpose of combining the information that was automatically learned by the distributed neural network systems. This information could be redistributed to the various installations as important failure characteristics are learned, thus increasing the on-line knowledge of all the installations.

Various sensor types could be used, including accelerometers, laser non-contact vibration sensors, micro-electromechanical systems, MEMS, and fiber-optic based vibration sensors, without departing from the spirit and scope of the present invention. Various display mechanisms could be employed, including flat-panel displays, cathode ray tubes, and Light Emitting Diode indicators.

Alarm mechanisms for excessive vibration could include flashing lights, and siren horns. Failure data could be transmitted through electronic mail to remote locations. The trending data could be accessed over the world wide web using Java applets.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A vibration analysis system for monitoring an operating device comprising:
   at least one vibration sensor;
   transform circuitry, coupled to the sensors, for transforming sensor outputs to frequency spectrum information;
   a fuzzy adaptive resonance-type neural network for receipt and processing of the information to generate selected output information.

2. A system as in claim 1 wherein the transform circuitry comprises a Fast Fourier Transform.

3. A system as in claim 1 which includes circuitry for converting frequency and amplitude information to serial form for presentation to the network.

4. A system as in claim 3 which includes an expert system for automatically analyzing the output information.

5. A system as in claim 1 wherein the transform circuitry comprises a programmed processor.

6. A system as in claim 1 wherein the neural network comprises a programmed processor and a plurality of network implementing instructions.

7. A system as in claim 6 wherein the transform circuitry is coupled to serializing circuitry which presents serial information to the network implementing instructions.

8. A system as in claim 7 which includes normalizing circuitry coupled between the transform circuitry and serializing circuitry.

9. A system as in claim 1 wherein parameters of the network have been adjusted in response to presenting data from at least one properly functioning source of vibrations.

10. A system as in claim 1 which includes windowing circuitry coupled between the sensor and the transform circuitry.

11. A system as in claim 1 which includes a filter and wherein sensor outputs are filtered before being coupled to the transform circuitry.

12. A system as in claim 11 which includes a digitizer coupled between the filter and the transform circuitry.

13. A system as in claim 1 which includes normalization circuitry, coupled to the transform circuitry, for providing a normalized frequency domain representation to the network.

14. A system as in claim 13 wherein the normalizing circuitry includes baseline noise removal circuitry.

15. A system as in claim 1 wherein the network includes a serial input port.

16. A system as in claim 15 wherein characteristics of a normal operating device have been incorporated into the network.

17. A system as in claim 16 wherein the memory of the network includes vibration-related information from a normally operating device.

18. A system as in claim 17 which includes circuitry for detecting differences between the stored information and signals from the sensor indicative of a current operating condition.

19. A system as in claim 17 which includes circuitry for detecting operational trends, in the input spectrum, which indicate at least one of device wear and device damage.

20. A method of analyzing vibrations generated by a device comprising:

training a resonant-type neural network to recognize a normal class of vibrations from the device using frequency domain inputs from comparable, normally functioning devices;

detecting vibrations from the device to be monitored;

converting the detected vibrations to a frequency domain representation using a variance reduced transform process;

presenting the frequency domain information serially to the trained network;

processing the information in the network; and determining if the detected vibrations are outside of the normal operating mode of the device.

21. A method as in claim 20 which includes filtering the detected vibrations.

22. A method as in claim 20 which includes detecting the operating speed of the device.

23. A method as in claim 22 which includes differentiating between periodic, speed related vibrations and non-speed related vibrations.

24. A method as in claim 20 which includes retraining only portions of the network in response to having carried out a maintenance procedure on the device.

25. A method as in claim 20 which includes coupling outputs from the network to an analysis system.

26. A software based vibration analysis system comprising:

executable instructions for transforming an input time domain signal to a frequency domain representation;

instructions for analyzing and normalizing the frequency domain representation; and instructions for implementing a resonant-type neural network including instructions for implementing network short term and longer term memory wherein nominal, expected characteristics of a selected type of device being analyzed can be stored.

27. A system as in claim 26 which includes instructions for detecting speed signals from the device and for distinguishing between substantially periodic, speed related and non-speed related signals.

28. A system as in claim 27 which includes instructions for removing base line noise from the frequency domain representation, and normalizing the frequency domain represented.

29. A system as in claim 28 which includes instructions for analyzing differences, detected by the network, between an expected spectral pattern and a spectral pattern for the input signal.

30. An apparatus comprising:

a movable vessel;

a turbine for moving the vessel;

at least one vibration sensor coupled to the turbine;

at least one speed sensor coupled to the turbine;

a processor for comparing digital frequency domain representations of the signals from at least the vibration sensor to prestored expected, frequency domain representations of turbine vibrations wherein the processor implements a software based, resonant-type neural network to carry out the comparing process.

31. An apparatus as in claim 30 which includes processing circuitry, coupled between the speed sensor and the processor and including executable instructions for distinguishing between speed related vibrations and non-speed related vibrations.

32. An apparatus as in claim 30 wherein the vessel is selected from a class which includes a marine platform, a land platform and an airborne platform.

33. An apparatus as in claim 32 which includes an output device and executable instructions for presenting to an operator indications of operational differences between the frequency domain representation of current signals from the vibration sensor and the prestored, expected frequency domain representations.

34. An apparatus as in claim 33 which include instructions for providing maintenance indicators to the operator.

35. A system as in claim 32 wherein the processor includes a digital signal processor.

36. A system as in claim 32 wherein the processor includes a programmable computer for executing at least some of the instructions.

37. A system as in claim 32 wherein the system transmits detected vibration information to an external collecting point, for incorporation into a general vibration database.

* * * * *